June 20, 1939.  S. L. CLOTHIER ET AL  2,163,543
METHOD OF AND APPARATUS FOR SCANNING MOTION PICTURE FILM
Filed July 17, 1937
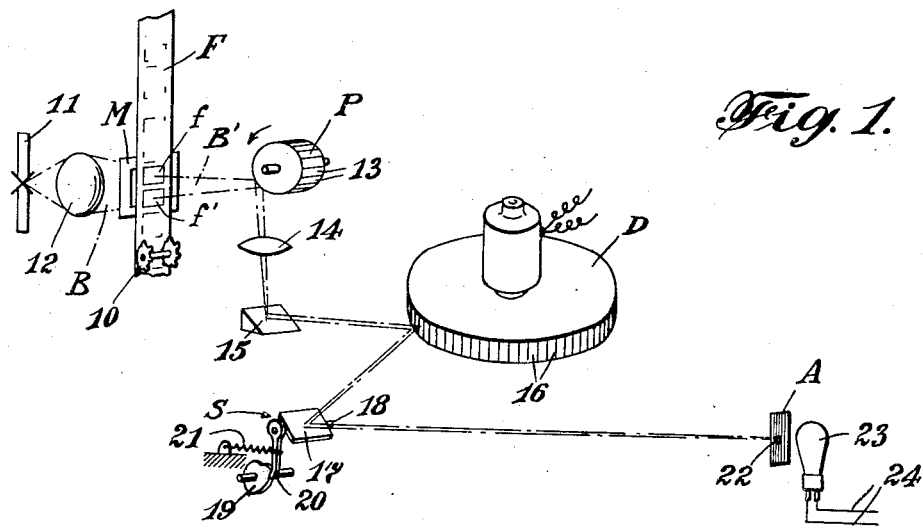
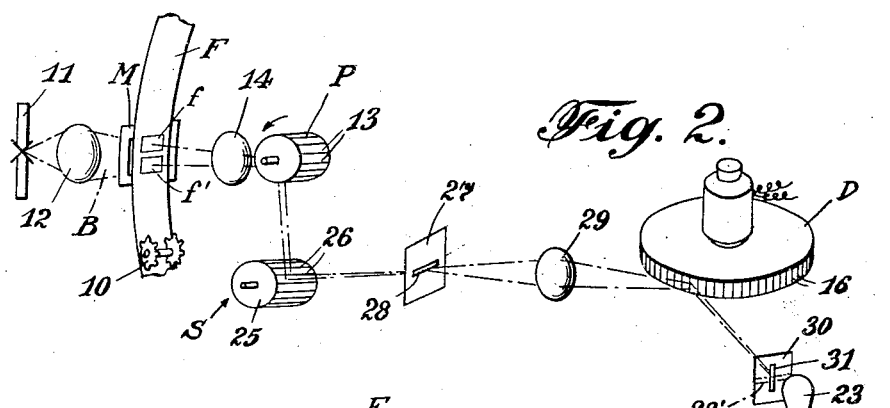
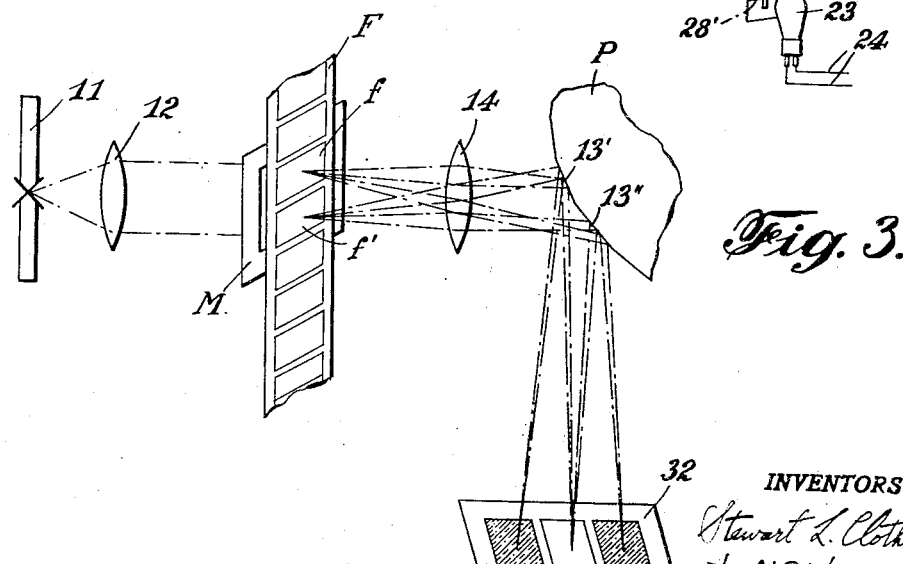
INVENTORS
Stewart L. Clothier
Harold C. Hogencamp Patented June 20, 1939

2,163,543

UNITED STATES PATENT OFFICE 2,163,543

METHOD OF AND APPARATUS FOR SCANNING MOTION PICTURE FILM

Stewart L. Clothier, Irvington, and Harold C. Hogencamp, Maplewood, N. J., assignors to Kolorama Laboratories, Inc., Newark, N. J., a corporation of New Jersey Application July 17, 1937, Serial No. 154,216

17 Claims. (Cl. 178—7.6)

This invention relates to improved methods and apparatus for scanning motion picture film.

Frequently it is desirable to scan motion picture film at a rate different from its normal projection speed. With standard film having a normal projection rate of twenty-four frames per second, it is some times desired to scan such film at other rates, for example, thirty frames per second. If the film were simply projected at a speed different from the normal rate in order to obtain the desired increased or decreased scanning speed, the resulting motion picture and the corresponding sound would not be faithfully reproduced.

Heretofore this difficulty has been overcome by operating the film at the standard projection rate in order to obtain faithful reproduction of the sound recording, and the film is scanned at a different rate by rescanning certain frames or certain portions thereof, or by skipping certain frames or portions thereof, producing the effect of scanning at a higher or a lower rate, without changing the projection speed.

This method possesses inherent disadvantages in that generally rescanning certain frames or skipping certain frames results in a sacrifice of the reproduction quality. Furthermore, the apparatus necessary to produce such results is generally of a comparatively complicated nature requiring delicate adjustment and manipulation.

Accordingly, the principal object of the present invention is to provide a method and apparatus whereby the film projection rate and the scanning rate may be selectively varied at will; a second object is to provide methods and apparatus whereby either the film projection movement or the scanning motion may be adjusted without affecting the operation of the other; another object is to increase the optical scanning efficiency; a further object is to provide means whereby the film may be moved continuously, while the scanning may be made to follow any predetermined regular or irregular motion. These and other objects of the invention will become more fully apparent from the specification and the accompanying drawing which discloses a preferred form of apparatus for accomplishing the invention.

In the drawing:

Fig. 1 is a diagrammatic view of one form of apparatus operating according to the present invention.

Fig. 2 is a diagrammatic view of another arrangement operating according to the present invention;

Fig. 3 is a diagrammatic view of the optical system employed with the present invention.

Generally speaking the invention comprises a method of, and apparatus for moving a motion picture film continuously at its standard projection rate in synchronism with a rotating prism which forms an image of each successive motion picture frame, and subsequently scanning the images, resolving them into elemental areas for cooperation with a light sensitive cell.

Referring again to the drawing and more particularly to Fig. 1, a preferred form of apparatus comprises a concentrated light source 11 such as an electric arc or incandescent filament, situated in spaced relation to a motion picture film F which is adapted to be moved continuously at the proper projection rate, as by means of rotating sprockets 10. A condensing lens 12, interposed between the source 11 and the film F concentrates the light rays and directs them as a beam B through the film F. The beam B is preferably of sufficient cross-section to cover two successive frames $f$ and $f'$ of the film F. If desired, an apertured mask M may be interposed between the lens 12 and the film F in order to block out undesirable portions of the beam B.

A right prism P is rotatably mounted in the path of the beam B′ emanating from the film on the side opposite the light source 11. The prism P is provided with a plurality of scanning elements such as plane reflecting surfaces 13 each surface of which is capable of reflecting the beam B′. These surfaces 13 may comprise ordinary glass mirrors, or they may consist of first-surface reflectors of any suitable material. The prism P may otherwise be constructed of solid glass or similar material, operating as a reflecting prism. The prism P is provided with means for rotating it in synchronism with the film F in such manner that the surfaces 13 nearest the film move in the same direction as the film, with a separate surface for each frame. Accordingly, if the prism P is provided with twelve reflecting surfaces it rotates at a speed of two revolutions per second, in the direction indicated by the arrow, when the film F is moved uniformly downward at the standard rate of twenty-four frames per second.

The beam B′ is reflected downwardly through a projection lens 14 upon a stationary mirror 15 from which the rays are reflected generally horizontally (for the sake of convenience) upon the periphery of a mirror drum D. The drum D is provided about its periphery with a plurality of reflecting surfaces or similar scanning elements 16 each of which is identical with every other, and preferably normal to a radius of the drum. Means such as a synchronous motor M is provided to rotate the drum D about its axis at the desired speed.

The beam B' is reflected from the successive plane surfaces 16 onto a frame scanning mechanism S operable about a pivot situated at right angles to the axis of the drum D. The scanning mechanism or scanner S may consist of any desired for sweeping the beam in a direction perpendicular to the direction of sweeping produced by the reflecting surfaces 16 of the drum D. In Fig. 1, the scanner S is shown as comprising a plane mirror 17, preferably of the first-surface type, mounted upon pivots 18 for oscillatory movement, such as may be imparted thereto by means of a rotatable plate cam 19 and a cam follower 20. The follower 20 is rigidly secured to the mirror 17 and is resiliently held against the cam surface as by means of a spring 21. The cam 19 may be of any desired shape but preferably is of such design as to impart constant angular velocity to the mirror 17 in alternate directions so that the velocity of the mirror 17, when plotted with respect to time, may be represented by a double sawtooth wave form. With a cam of the configuration shown in Fig. 1, two complete vibrations or oscillations of the mirror 17 occur during each rotation of the cam, so that if it is desired to scan at the rate of thirty frames per second the cam 19 must be rotated at fifteen revolutions per second. Obviously the cam 19 may be of such design as to produce one vibration of the mirror 17 during each revolution of the cam, the motion followed being of sinusoidal, sawtooth, or irregular type. The arrangement lends itself well to use with an oscillograph mirror in place of the cam-operated mirror 17, whereby the same simple-harmonic or other type of motion may be obtained electro-magnetically and without the use of any form of cam.

An aperture plate A is positioned in the path of the beam B' reflected from the mirror 17. The plate is provided with a small aperture 22, preferably of square configuration and of a size equal to that of an elemental scanning area of the image, behind which is positioned a photo-electric cell 23. Wires 24 lead from the photocell 23 to a suitable amplifier of any conventional design.

The prism P, mirror 15, drum D, and scanner S are all arranged with respect to one another so that the beam B' passing through the film F is directed upon the aperture plate A. The positions of the lens 14 and prism P are then preferably adjusted so that images of the frames f and f' are superimposed upon the aperture plate A in a manner to be more fully described.

It will be noted that with the arrangement shown in Fig. 1, when the film F alone is moved, a vertical streak produced by the moving image appears on the aperture plate A, while as soon as the prism P is rotated in synchronism, the moving picture image is formed on the plate A, the movement of the prism arresting the motion of each successive image. When the line-scanning drum D alone is operated, a horizontal streak of image height appears on the plate A, caused by the repeated shifting of the image horizontally by the successive mirrors 16. Similarly when the frame scanner S alone operates, a vertical streak of normal image width appears on the plate A as a result of the alternate raising and lowering of the image at the frame-scanning frequency.

In operation, the film F is moved, for example downwardly at the standard projection rate. The prism P is rotated in synchronism with the film so that light from successive frames f and f' is reflected from adjoining surfaces 13 of the prism P. With the film F and the prism P moving in synchronism in the direction indicated, and with the lens 14 properly positioned, the moving picture image appears upon the surface of the aperture A. Since the beam B' may occupy more than one surface 16 of the drum D, additional real images or portions thereof may be formed on the aperture plate A. The drum D and the scanner S are next set in motion to move the images in vertical and horizontal directions in the plane of the aperture plate A so that successive portions of each image are superimposed upon the aperture 22, at a rate determined by the speed of the drum D and the scanner S. In this manner every portion of the image is progressively superimposed upon the aperture 22 and that portion of the beam B' which passes through the aperture excites the photocell 23 to produce the signal impulses corresponding to the light intensity of the elemental areas of the image.

A modified form of apparatus is shown in Fig. 2. Identical reference numerals are used to designate corresponding parts. The beam B is formed by the light source 11 and lens 12 and passes through the mark M and film F. If desired the film may be curved slightly about the axis of the prism P as a center to eliminate a source of slight distortion. The projection lens 14 may be preferably positioned as shown, between the film F and the prism P. The frame scanner S, in the modified apparatus comprises a mirror drum 25, provided with a plurality of plane reflecting surfaces 26 capable of reflecting successive vertically shifting images upon a slotted aperture plate 27 during rotation of the drum. Although the plate 27 preferably comprises a plane opaque sheet provided with a straight slot 28 parallel to the axis of the drum 25, it may otherwise comprise an irregular slotted aperture plate of the type disclosed in applicants' copending application entitled "Scanning methods and apparatus", Serial No. 104,172, filed October 6, 1936. The lens 14 is so positioned as to form a sharp image of the film F upon the plate 27 when the drum 25 is stationary.

A second lens 29 projects an image 28' of the illuminated aperture 28 upon the aperture plate 30 after being reflected from the plane mirrored surfaces 16 bounding the periphery of the line scanning drum D. The plate 30 is provided with a slot 31 parallel with the axis of the drum D and generally perpendicular to the slot 28, so that the image 28' crosses the slot 31, illuminating a small, preferably square area corresponding to the opening in the plate A. Through the use of angularly disposed slotted plates 27 and 30 of the type shown in Figure 2, slight irregularities in the movement of the image produced by mechanical inaccuracies have little or no deleterious effect on the signals produced because the result is but a slight shifting in position of the illuminated square exposed to the photocell.

The operation of the device shown in Fig. 2 is substantially identical with that shown in Fig. 1. The film F moves continuously, for example in a downward direction, and the prism P rotates in synchronism therewith, in such a manner that the movement of the image of each successive frame, formed on the plate 27 by the lens 14, is arrested when the scanner S is at rest. For example, when a prism P having twelve sides is used, the rate of rotation should be two revolutions per second when the film is traveling at twenty-four frames per second. The scanner S is rotated to provide the desired frame scanning rate. For example, when twelve surfaces are employed, the drum 25 should be rotated, as by a synchronous motor, at five revolutions per second if sixty frames per second are desired. The drum D is rotated to provide the desired number of scanning lines. It will be observed that a substantially continuous motion picture image is formed on the plate 27 which may be scanned by the drum 25 and the drum D at any desired rate.

An appreciable gain in optical efficiency may be obtained with apparatus of the type shown in Figs. 1 or 2, if the arrangement diagrammatically disclosed in Fig. 3 is followed. The mask M as shown is provided with an opening large enough to cover two successive frames f and f'. With a mask of the type shown, two images of each frame f and f' are formed after the beam is reflected from two successive surfaces 13' and 13'', as diagrammatically shown in Fig. 3, so that four images in all are simultaneously formed on the surface of the screen 32, corresponding to the aperture plate A of Fig. 1, or the plate 27 of Fig. 2. By properly spacing the prism P from the film F, and by suitably adjusting the lens 14, one image of frame f, and one image of frame f' may be brought into such close proximity that they are superimposed in coincident relation. An appreciable gain in illumination is thus obtained and the distortion produced by the slight difference between the distortion produced by the slight difference between the two superimposed images of adjoining frames is unnoticeable.

It will be noticed that one of the advantages to be derived from this type of film scanning resides in the fact that the projector or film feeding mechanism may be operated at one desired speed, for example, at the standard projection speed of twenty-four frames per second for ordinary sound film, while the picture may be scanned independently at this same speed or at any other desired speed. By operating the projector at standard speed, the accompanying sound can be reproduced from the regular sound track on the film regardless of the scanning speed. Independently the scanner S may be operated at any speed and according to any type of motion, as long as it is in synchronism with a corresponding frame scanning means in the receiving apparatus.

It is to be understood that the herein-described apparatus is illustrative merely of one manner of carrying out the invention and is not to be construed in a limiting sense as we contemplate any method or apparatus properly within the scope of the appended claims.

We claim:

1. The method of scanning continuously moving motion picture film comprising forming stationary and coincidently superimposed images of at least two successive frames of said motion picture film, exposing an elemental area of said images upon a photoelectric cell, and shifting said images so that successive elemental areas thereof are progressively exposed to said photoelectric cell.

2. In a method of scanning motion picture film; the steps comprising continuously moving the film, passing a light beam through successive frames of the film, reflecting the beam from the successive planes of a rotating prism, focussing the beam to form stationary and coincidently superimposed images of at least two successive frames, and intercepting the beam to produce shifting of said images in mutually perpendicular directions.

3. In a method of scanning continuously moving motion picture film, the steps comprising simultaneously forming stationary images of each of at least two successive frames of the film being scanned; coincidently superimposing said images upon a screen, and scanning said images to produce electrical impulses.

4. A method of scanning motion picture film, comprising forming coincidently superimposed images of at least two successive adjoining frames of said motion picture film; continuously moving said film; arresting the motion of the image of each frame caused by the film motion; exposing an elemental area of each image to a photoelectric cell; and shifting said image successively so that the elemental areas comprising the image are progressively exposed to said photoelectric cell.

5. A method of translating elemental areas of a moving photographic record into corresponding electrical impulses, which method comprises moving the photographic record at a continuous rate of speed; forming coincidently superimposed images of at least two frames of said record; optically arresting the motion of said images produced by the motion of said record; and successively line scanning and frame scanning said images to produce electrical impulses.

6. Apparatus for scanning motion picture film comprising means for continuously moving said film; means for illuminating at least two successive frames of said film, a rotating prism exposed to the illuminated frames for reflecting an image of successive frames, an aperture plate, means for forming coincidently superimposed images of at least two of said successive frames upon said aperture plate and for arresting the motion of the images caused by the motion of the film, and means for shifting said images substantially in the plane of said aperture plate, in mutually perpendicular directions.

7. Apparatus for scanning motion picture film comprising means for moving said film at a constant rate of speed; means for projecting a light beam through at least two successive frames of said film; a rotating prism in the path of said beam, said prism being bounded by reflecting planes; an aperture plate; means for focussing said beam upon said aperture plate to form thereon stationary and coincidently superimposed images of at least two successive frames; and scanning mechanism positioned in the path of said beam between said focussing means and said aperture plate, said mechanism causing said images to shift upon said aperture plate.

8. Apparatus according to claim 7 wherein said scanning mechanism comprises a mirror drum, and an oscillatory mirror.

9. Apparatus according to claim 7 wherein said scanning mechanism comprises an oscillatory mirror, and a cam for oscillating said mirror.

10. Apparatus according to claim 7 wherein said scanning mechanism comprises an oscillatory mirror and means for imparting uniform angular velocity in alternate directions to said mirror.

11. An apparatus for scanning motion picture film including means for moving the film at a continuous rate of speed; means for forming coincidently superimposed images of at least two successive frames of said film upon an aperture plate and for arresting the motion of the images caused by the motion of the film; and means for successively shifting the images in the plane of said plate substantially in the directions of the coordinates of said images.

12. An apparatus for scanning motion picture film comprising means for moving the film at a continuous rate of speed; means for projecting a light beam through at least two frames of said film; means including a first lens and a mirror prism in the path of said beam for forming coincidently superimposed images of at least two successive frames of said film upon a first aperture plate; means for moving said movable mirror prism for arresting the motion of the image of each successive frame caused by the film motion; means positioned between said mirror and said first plate for shifting the successively formed images in the plane of said first plate at the desired frame-scanning rate; a second lens for projecting an image of the aperture of said first plate upon a second aperture plate; a photocell behind the aperture of said second plate; and a line-scanning mirror drum between said second lens and said second aperture plate for intercepting the beam from said first aperture plate.

13. An apparatus for scanning motion picture film comprising means for moving the film at a continuous rate of speed; means for projecting a light beam through at least two frames of said film; means including a first lens and a mirror prism in the path of said beam for forming coincidently superimposed images of at least two successive frames of said film upon a first aperture plate; means for moving said mirror prism for arresting the motion of the image of each successive frame caused by the film motion; means for moving the film past the light beam in a curved path, said path having a center of curvature substantially coinciding with the axis of said mirror prism; means positioned between said mirror and said first plate for shifting the successively formed images in the plane of said first plate at the desired frame-scanning rate; a second lens for projecting an image of the aperture of said first plate upon a second aperture plate; a photocell behind the aperture of said second plate; and a line-scanning mirror drum between said second lens and said second aperture plate for intercepting the beam from said first aperture plate.

14. Apparatus as set forth in claim 12 wherein said respective aperture plates are provided with slots so arranged that the image of the slot of said first plate is formed on said second aperture plate substantially perpendicular to the slot in said second plate.

15. Method as claimed in claim 3 wherein the images are scanned at a frame rate different from the frame rate at which the film is moved.

16. Method as claimed in claim 5 wherein the images are scanned at a frame rate different from the frame rate at which the film is moved.

17. Apparatus as claimed in claim 12 including means whereby the images are shifted at a frame-scanning rate different from the frame rate at which the film is moved.

STEWART L. CLOTHIER.
HAROLD C. HOGENCAMP.